United States Patent
Nemazie et al.

(10) Patent No.: US 9,251,059 B2
(45) Date of Patent: Feb. 2, 2016

(54) STORAGE SYSTEM EMPLOYING MRAM AND REDUNDANT ARRAY OF SOLID STATE DISK

(71) Applicant: Avalanche Technology, Inc., Fremont, CA (US)

(72) Inventors: Siamack Nemazie, Los Altos Hills, CA (US); Ngon Van Le, Fremont, CA (US); Anilkumar Mandapuram, San Jose, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

(21) Appl. No.: 13/858,875

(22) Filed: Apr. 8, 2013

(65) Prior Publication Data

US 2014/0281142 A1   Sep. 18, 2014

Related U.S. Application Data (63) Continuation-in-part of application No. 13/769,710, filed on Feb. 18, 2013, now Pat. No. 8,909,855, which is a continuation-in-part of application No. 13/745,686, filed on Jan. 18, 2013, now Pat. No. 9,009,396, and a continuation-in-part of application No. 13/673,866, filed on Nov. 9, 2012, now abandoned, and a continuation-in-part of application No. 13/570,202, filed on Aug. 8, 2012, now abandoned.

(60) Provisional application No. 61/538,697, filed on Sep. 23, 2011.

(51) Int. Cl.
G06F 12/00 (2006.01)
G06F 12/02 (2006.01)
G06F 12/08 (2006.01)
G06F 11/10 (2006.01)

(52) U.S. Cl.
CPC .......... *G06F 12/0246* (2013.01); *G06F 11/108* (2013.01); *G06F 12/0868* (2013.01); *G06F 12/0873* (2013.01); *G06F 2212/222* (2013.01); *G06F 2212/262* (2013.01); *G06F 2212/7205* (2013.01)

(58) Field of Classification Search
None
See application file for complete search history.

(56) References Cited

U.S. PATENT DOCUMENTS

| 5,574,906 | A  |   | 11/1996 | Morris |
|---|---|---|---|---|
| 5,900,014 | A  |   | 5/1999  | Bennett |
| 6,467,022 | B1 |   | 10/2002 | Buckland et al. |
| 7,096,316 | B1 | * | 8/2006  | Karr et al. ...................... 711/114 |

(Continued)

OTHER PUBLICATIONS

He Institute of Electrical and Electronics Engineers, "IEEE Standard Glossary of Software Engineering Terminology", IEEE Std 610.12-1990, Sep. 28, 1990, 2 pp.

(Continued)

*Primary Examiner* — Baboucarr Faal
(74) *Attorney, Agent, or Firm* — Maryam Imam; Bing K. Yen (57) ABSTRACT

A storage system includes one or more RAID groups, a RAID group comprising a number of physically addressed solid state disks (paSSD). Stripes are formed across a RAID group, data to be written is saved in a non-volatile buffer until enough data for a full strip is received (without any restriction about logical address of data), full stripes are sent and written to paSSDs comprising the RAID group, accordingly the partial stripe read-modify-write is avoided.

24 Claims, 5 Drawing Sheets

(56) References Cited

U.S. PATENT DOCUMENTS

| | | |
|---|---|---|
| 7,752,381 B2 | 7/2010 | Wong |
| 8,291,149 B2 * | 10/2012 | Azuma et al. .................... 711/2 |
| 2003/0145167 A1 * | 7/2003 | Tomita ........................ 711/114 |
| 2004/0268035 A1 * | 12/2004 | Ueno ........................... 711/112 |
| 2005/0068802 A1 | 3/2005 | Tanaka |
| 2006/0215449 A1 | 9/2006 | Nam et al. |
| 2006/0253645 A1 | 11/2006 | Lasser |
| 2007/0033431 A1 * | 2/2007 | Pecone et al. .................... 714/6 |
| 2008/0034154 A1 | 2/2008 | Lee et al. |
| 2008/0177936 A1 | 7/2008 | Lasser et al. |
| 2008/0219044 A1 | 9/2008 | Yoon et al. |
| 2010/0033700 A1 | 2/2010 | Okada et al. |
| 2010/0037001 A1 | 2/2010 | Langlois et al. |
| 2010/0138592 A1 | 6/2010 | Cheon |
| 2010/0169553 A1 | 7/2010 | Yano et al. |
| 2010/0191896 A1 * | 7/2010 | Yang et al. .................... 711/103 |
| 2010/0306451 A1 | 12/2010 | Johnson |
| 2011/0082996 A1 | 4/2011 | Wester et al. |
| 2012/0089796 A1 * | 4/2012 | Fukazawa et al. ............ 711/162 |
| 2012/0324246 A1 | 12/2012 | Rahardjo et al. |
| 2013/0132643 A1 * | 5/2013 | Huang ......................... 711/103 |
| 2013/0332648 A1 | 12/2013 | Kandiraju et al. |
| 2014/0047159 A1 | 2/2014 | Ahwal et al. |
| 2014/0208024 A1 * | 7/2014 | Simionescu ............ G06F 3/061 711/114 |

OTHER PUBLICATIONS

EE Times, "Startup enters STT-MRAM race", Feb. 19, 2014, 3 pp.
MacWorld, "Freescale first to market with MRAM memory chips", Jul. 10, 2006, 5 pp.
Everspin Technologies, Inc., "Everspin Technologies expands its distribution network to serve rapid growth in demand for mRAM products", Chandler, Arizona, May 25, 2011, 2 pp.
LaPedus, et al., Startup enters STT-MRAM race by Mark LaPedus; EETime Apr. 2009.

* cited by examiner

STORAGE SYSTEM EMPLOYING MRAM AND REDUNDANT ARRAY OF SOLID STATE DISK

This application claims priority to U.S. Provisional Patent Application No. 61/800,286, filed on Mar. 15, 2013, by Siamack Nemazie, et al. and entitled "Storage System Employing MRAM and Redundant Array of Solid State Disk", and is a continuation-in-part of U.S. patent application Ser. No. 13/769,710, filed on Feb. 19, 2013, by Siamack Nemazie and entitled "Storage System Employing MRAM and Physically Addressed Solid State Disk", which is a continuation-in-part of U.S. patent application Ser. No. 13/745,686, filed on Jan. 18, 2013, by Siamack Nemazie and entitled "Physically Addressed Solid State Disk Employing MRAM", which is a continuation-in-part of U.S. patent application Ser. No. 13/673,866, filed on Nov. 9, 2012, by Siamack Nemazie and entitled "SYSTEM EMPLOYING MARAM AND PHYSICALLY ADDRESSED SOLID STATE DISK", which is a continuation-in-part of U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)", which claims priority U.S. Provisional Application No. 61/538,697, filed on Sep. 23, 2011, entitled "Solid State Disk Employing Flash and MRAM", by Siamack Nemazie, incorporated herein by reference as though set forth in full.

BACKGROUND OF THE INVENTION

1. Field of the Invention

This invention relates generally to Peripheral Component Interconnect Express (PCIe) and particularly to stripe table in a storage system employing PCIe.

2. Background

Solid State Drives (SSDs) using flash memory have become a viable alternative to Hard Disc Drives (HDDs) in many applications. Such applications include storage for notebook and tablets where storage capacity is not too high and power and or weight and form factor are key metrics and storage spaces for servers with both power, performance (sustained read/write, random read/write) and reliability being key metrics.

SSDs, by eliminating mechanical parts, are inherently more reliable than HDDs. Hardware platforms used in enterprise applications require high reliability as measured by Mean Time Between Failures (MTBF) and/or Bit Error Rate (BER). Adding redundancy clearly increases the reliability of storage systems.

Redundant Array of Independent Discs (RAID) has been used to provide a highly reliable storage system using HDDs. There are several RAID levels that have evolved. RAID level 4 (or RAID 4) and RAID level 5 (RAID 5) are block stripped that add redundant information in the form of parity and allow repairing one failed disk. In RAID 4, one physical disk in the array is dedicated for parity, and in RAID 5, the parity is distributed throughout the physical disks in the array rather than being placed on a single disk. The parity defined in RAID 4 and RAID 5 is the exclusive-OR of the data on corresponding stripped blocks of the other disks. Parity generation for a partial stripe (when the amount of write is not a multiple of full strip) is a bottleneck for RAID and specifically RAID 4 and RAID 5. RAID level 6 (or RAID 6) is block stripped that adds two redundant information in the form of parity and allow repairing up to two failed disk.

A well know problem in a redundant array of physically addressed solid state disks (paSSD) system is parity update when a partial stripe is updated that requires a read modify write.

The management of blocks within the flash subsystems includes "garbage collection" (also referred to as "GC") for collecting valid pages from a group of blocks (with a mix of valid and invalid page) into fewer blocks and in the process creating free blocks.

A problem in a redundant array of physically addressed solid state disks system is parity update for garbage collection that requires extra bus bandwidth to read all valid pages of blocks being garbage collected and write back with updated parity.

What is required is a redundant array of solid state disks that eliminates the need for partial strip read modify write.

SUMMARY OF THE INVENTION

To overcome the problem described above, and to overcome other limitations that will become apparent upon reading and understanding the specification, the invention discloses.

Briefly, in accordance with an embodiment of the invention, a storage system includes one or more RAID groups, a RAID group comprising a number of physically addressed solid state disks (paSSD). Stripes are formed across a RAID group, data to be written is saved in a non-volatile buffer until enough data for a full strip is received (without any restriction about logical address of data), full stripes are sent and written to paSSDs comprising the RAID group, accordingly the partial stripe read-modify-write is avoided.

Further the bus bandwidth required for garbage collection is reduced by avoiding the write back of a number of valid pages during garbage collection.

These and other objects and advantages of the invention will no doubt become apparent to those skilled in the art after having read the following detailed description of the various embodiments illustrated in the several figures of the drawing.

DESCRIPTION OF VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

Figure 1:
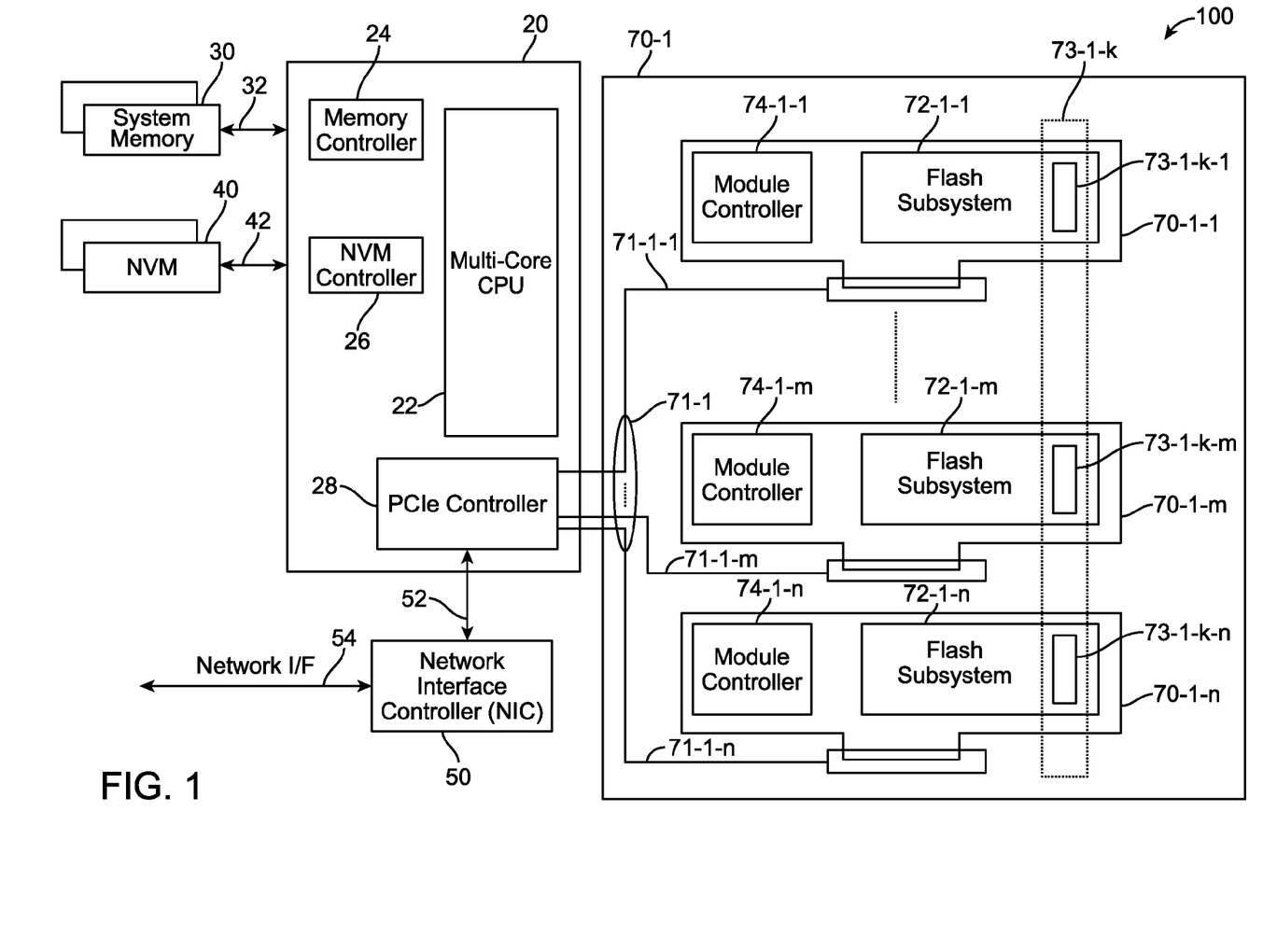
FIG. 1 shows a block diagram of an embodiment of the invention.

Referring now to FIG. 1, a storage system 100 is shown, in accordance with an embodiment of the invention. The system 100 is shown to include a Central Processor Unit (CPU) subsystem 20 (also known herein "host"), a system memory 30, a non-volatile memory (NVM) module 40, and one or more arrays (also referred to as RAID group) of physically-addressed solid state disks (paSSD) 70-1, in accordance with an embodiment of the invention.

The CPU subsystem 20 is shown to include a multi-core CPU 22 and a memory controller 24, a non-volatile memory controller 26, and a PCIe controller 28. The memory controller 24 is shown coupled through a memory bus 32 to the system memory 30. The NVM controller 26 is shown coupled to NVM module 40 through the NVM bus 42. The memory 30 is shown coupled to the memory controllers 24 through the memory bus 32.

The system 100 is further shown to include a network interface controller (NIC) 50. The NIC 50 is shown coupled to CPU subsystem 20 through a PCIe bus 52 and is further coupled to the network interface 54 for connection to a network (not shown). The NIC 50 is shown to receive input through the network interface 54.

The RAID group 70-1 is shown to include a bank of paSSDs 70-1-1 to 71-1-n. Each of the paSSDs 70-1-j (j from 1 to n, n being an integer) of the array 70-1 is shown to include a flash subsystem 72-1-j and shown coupled to CPU subsystem 20 through a PCIe bus 71-1-j. A "Bank", as used herein, refers to one or more.

The management of blocks within the flash subsystems, referred to herein as "flash block management", includes:

Logical to Physical Mapping; Defect management for managing defective blocks (blocks that were identified to be defective at manufacturing and grown defective blocks thereafter);

Wear leveling to keep program/erase cycle of blocks within a band; Keeping track of free available blocks; and Garbage collection (also referred to as "GC") for collecting valid pages from a plurality of blocks (with a mix of valid and invalid page) into one block and in the process creating free blocks.

The flash block management requires maintaining various tables referred to as flash block management tables (or "flash tables").

In the system 100 of FIG. 1, flash block management is generally performed by a software driver 34 (shown in FIG. 2), which is loaded during system initialization after power up.

In some embodiment of the invention, flash block management tables are maintained in the NVM 40. In another embodiment of the invention flash block management tables are maintained in system memory 30 and are nearly periodically saved in the flash subsystem onboard the paSSDs 70-1-j and the parts of the tables that are updated since the last save are additionally maintained in the NMV 40. Further details of the flash block management tables are disclosed in U.S. patent application Ser. No. 13/745,686, filed on Jan. 18, 2013, by Siamack Nemazie and entitled "Physically Addressed Solid State Disk Employing MRAM" and U.S. patent application Ser. No. 13/673,866, filed on Nov. 9, 2012, by Siamack Nemazie and entitled "SYSTEM EMPLOYING MARAM AND PHYSICALLY ADDRESSED SOLID STATE DISK", and U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)", the contents of all of which are hereby incorporated by reference herein as though set forth in full.

Stripe:

A stripe consists of a group of equal chunks of flash storage in each paSSD 70-1-j (j being from 1 to n, 'n' and 'j' each being an integer value) of the RAID group 70-1. At times, "chunks" are referred to as "stripe segments" and chunk size is referred to as "stripe segment size" and the number of segments in a stripe (n for stripe 70-1-j) is referred to as "stripe width".

The RAID group 70-1 includes more than one stripe 73-1-k ("k" being from 1 to "z", z and k each being an integer value). Further shown in FIG. 1 is a stripe 73-1-k (k from 1 to z, z being an integer) of the RAID group 70-1 and shown to include a stripe segment 73-1-k-j in each paSSD 70-1-j (j from 1 to n, n being an integer). A parity stripe segment contains parity of the other stripe segments and a data stripe segment contains data. For RAID 4 or RAID 5, there is one parity segment and for RAID 6 there are two parity segments. The stripe size is the total size of the data stripe segments, that is, the stripe segment size times the number of data stripe segments in the stripe.

In some embodiments of the invention, the data stripe segments are each composed of random Logical Block Addresses (LBAs) but related Physical Addresses (PAs). In one embodiment, the PAs have the same (block/page) offsets as each other (or the corresponding alternate block if the PA is defective), such that the stripes are formed from pages having the same page number and from blocks having the same block number. If the block is a defective block, the alternate block address is used. In another embodiment, a stripe table 34k (shown in FIG. 2) is used to identify the PAs that form each stripe. In yet another embodiment, the stripe segment size is a page size or multiple of page sizes, and stripes are formed from corresponding pages (pages with same page number) of a group of blocks, such as one from each paSSD of the RAID group 70-1. The group of blocks is referred to herein as a "stripe block". The corresponding entry in the stripe table for a stripe includes the PA of blocks from each paSSD in the RAID group.

As earlier indicated, the LBAs in a stripe are random, as a result and advantageously, as soon as a stripe size worth of data is available, it can be assigned to a stripe. Associated parity is then calculated and written to the assigned stripe. The data is saved in an NVM 40 until it is written to the assigned stripe. Accordingly, the partial stripe read-modify-write of prior art techniques is avoided.

As known in the art, a problem with volatile memory (such as DRAM or SRAM) for storing data is power failure prior to writing data to a persistent memory, requiring a battery-backed volatile memory or a flash-backed memory. In a flash-backed memory, a capacitor (specifically a supercapacitor) provides backup power for a short interval after power fail/shut down, sufficient to save critical data (data that cannot be lost prior to saving in a persistent memory in the event of a power fail or shut down or a system crash) in a (volatile) memory to a non-volatile flash memory. An example of flash-backed memory is Non-volatile Dual Inline Memory Module (NV DIMM). NV DIMM is a memory module comprising of volatile DRAM and non-volatile flash wherein a supercapacitor provides backup power for a short interval after power fail/shut down, sufficient to save critical data in the DRAM to the flash onboard the NV DIMM.

In accordance with one embodiment of the invention, the NVM 40 is an NV DIMMM. In accordance with another embodiments of the invention, the NVM 40 is flash-backed memory wherein the critical data in the NVM 40 is saved in the flash memory, i.e. the flash subsystems 72-1-1 to 72-1-m, in some embodiments. In the event of a power fail or shut down or a system crash, a capacitor (specifically a supercapacitor) provides backup power for a short interval after power fail/shut down/crash, sufficient to save critical data in NVM 40 to a designated area of the flash subsystem 72-1-*j*.

In accordance with yet another embodiment of the invention, the NVM 40 is a (non-volatile) Magnetic Random Access Memory (MRAM) where data along with state information (such as a journal or log as is known in the art) is written. On power up, during initialization, the state information is read and any pending write in the MRAM which was not completed due to a power fail/shut down/crash is completed. In yet another embodiment of the invention, the MRAM is a Spin Torque Transfer MRAM (STTMRAM).

Figure 2:
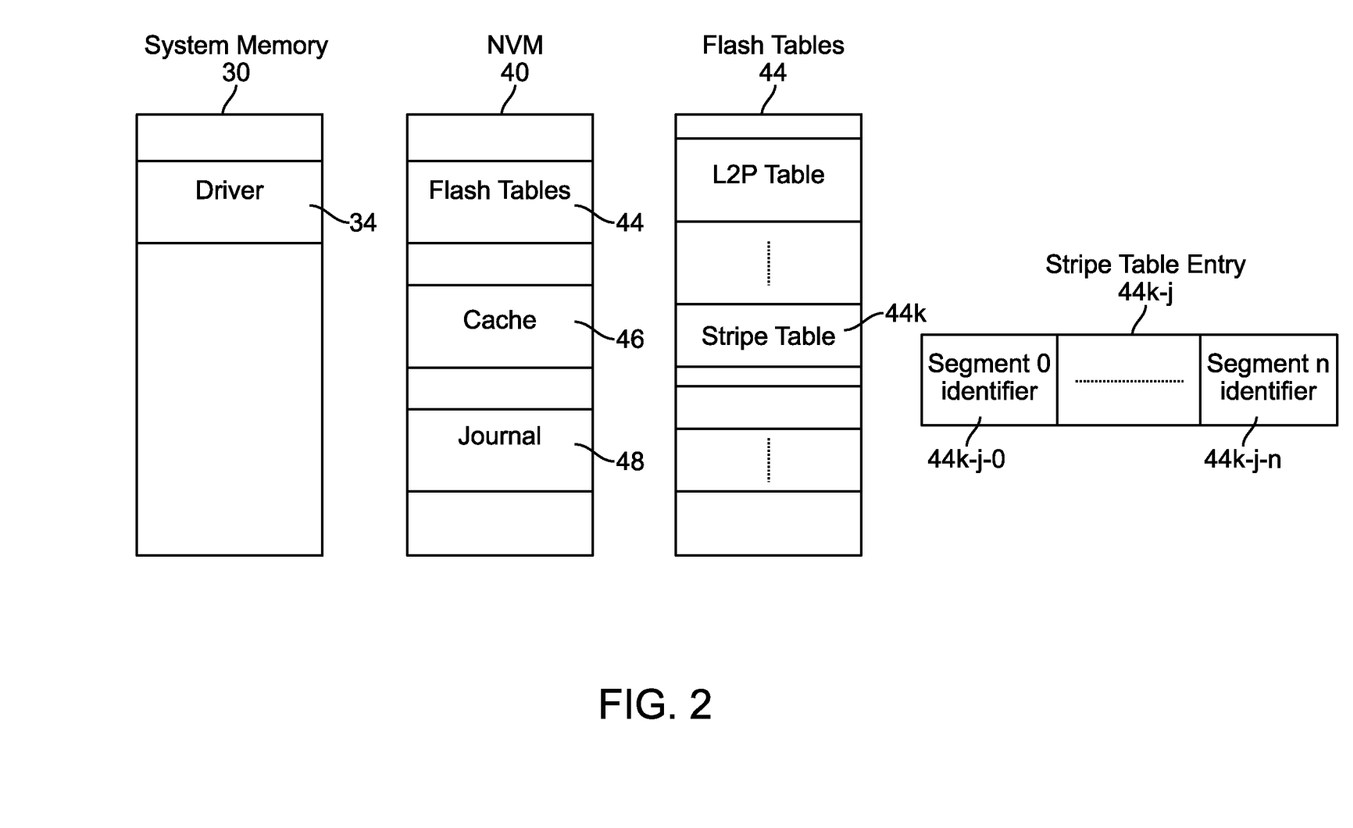
FIG. 2 shows the tables stored in the embodiment of FIG. 1 and flash management table 34, in accordance with another embodiment of the invention.

FIG. 2 shows exemplary tables of the flash block management tables. Specifically, in FIG. 2, exemplary system memory 30 and NVM 40 are shown. In FIG. 2, the driver 34 is shown to be maintained in the system memory 30 and the flash tables 44 are shown to be maintained in the NVM 40 and include a stripe table 44*k*. Further shown in FIG. 2, is an exemplary stripe table entry 44*k-j* for a stripe j, shown to include a segment identifier 44*k-j*-0 to 44*k-j-n* (j from 1 to n, n being an integer), for each segment of the strip 44*k-j*. In the embodiments with stripe block, the segment identifier 44*k-j*-0 to 44*k-j-n* are PA of the blocks forming the stripe block.

Further details of flash tables are disclosed in U.S. patent application Ser. No. 13/745,686, filed on Jan. 18, 2013, by Siamack Nemazie and entitled "Physically Addressed Solid State Disk Employing MRAM", U.S. patent application Ser. No. 13/673,866, filed on Nov. 9, 2012, by Siamack Nemazie and entitled "SYSTEM EMPLOYING MARAM AND PHYSICALLY ADDRESSED SOLID STATE DISK", and U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)" incorporated herein by reference as though set forth in full.

Figure 3:
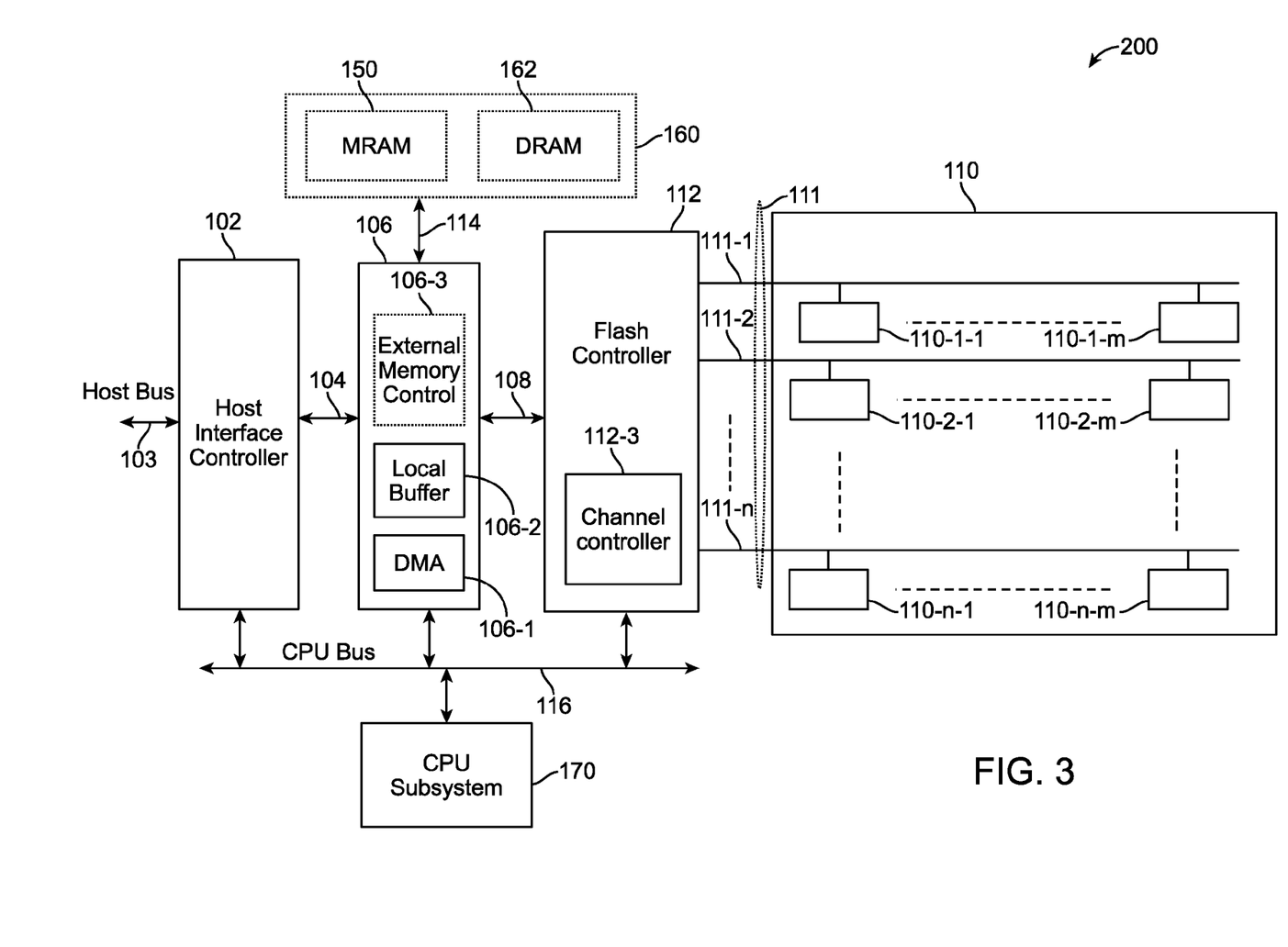
FIG. 3 shows a block diagram of a physically addressed solid state disk, in accordance with yet another embodiment of the invention.

Referring now to FIG. 3, further details of paSSDs 70-1-*j*, or paSSD 200, is shown to include a host bus 103 (a PCIe bus), a host interface controller (a PCIe interface Controller) 102, a buffer memory control 106, a flash controller 112, a flash subsystem 110 (referred to as 72-1-*j* in FIG. 1), an optional buffer subsystem 160, and a central processor unit (CPU) subsystem 170, in accordance with an embodiment of the invention.

The host bus 103 is shown coupled to the host interface controller 102 and the host interface controller 102 is shown coupled to the buffer memory control 106 through the host controller bus 104 and the buffer memory control 106 is shown coupled to the flash controller 112 through the flash controller bus 108. The buffer memory control 106 is further shown coupled to the buffer subsystem 160 through the buffer memory bus 114. The host interface controller 102, the buffer memory control 106 and the flash controller 112 are each shown coupled to the CPU subsystem 170 through the CPU bus 116. The flash controller 112 is shown coupled to the flash subsystem 110 via flash interface 111.

The host interface controller 102 communicates with one or more hosts via host bus 103 and manages the host interface protocol. The buffer memory control 106 is shown to include a Direct Memory Access (DMA) 106-1, a local buffer 106-2 and an external memory control 106-3 for controlling access to the (optional) buffer subsystem 160. The buffer memory control 106 transfers data between the local buffer 106-2 or the (optional) buffer subsystem 160 and the host bus 103, Flash interface 111 and the CPU subsystem 170. The flash controller 112 interfaces with flash subsystem. The flash 110 is used as persistent storage for storage of data. The CPU subsystem 170 controls and manages and execution of host commands.

The flash subsystem 110 is shown to include a number of flash memory components or devices (110-1-1 to 110-1-*m*, ... 110-*n*-1 to 110-*n-m*, "n", and "m" being integer values) which can be formed from a single semiconductor or die or from a number of such dies. The flash subsystem 110 is shown coupled to the flash controller 112 via flash interface 111. The Flash interface 111 includes of one or more flash channels 111-1 to 111-*n*.

In some embodiments, the buffer subsystem 160 is optional and in its place, the local buffer 106-2 is used. The buffer subsystem 160 can take on various configurations. In some configurations, it includes DRAM and in others, it includes MRAM and in yet others, such as that which is shown in FIG. 1, it includes DRAM 162 and the MRAM 150.

In the embodiment of FIG. 3, the buffer subsystem 160 is shown to include the DRAM 162 and the MRAM 150, both of which are coupled to control 106 via a single interface bus, the BM-Bus 114. In other embodiments, this bus is made of two busses, one for the DRAM 162 and the other for the MRAM 150. The CPU subsystem 170 can access the buffer system 160 or local buffer 106-2 concurrently with other accesses. CPU accesses to buffer subsystem 160 are interleaved with host bus 103 and flash interface 111 accesses to the buffer subsystem 160 or local buffer 106-2.

In some embodiments, the MRAM 150 is made of spin transfer torque MRAM (STTMRAM) cells and in other embodiments, it is made of other magnetic memory cells. The flash controller 112 is shown to include a channel controller 112-3 for controlling flow of command, data and status on flash interface 111. The channel controller 112-3 is operable to save data read from flash 110 in response to one or more host read commands in designated page buffers in the local buffer 106-2 or the (optional) buffer subsystem 160. Furthermore the channel controller 112-3 is operable to write to flash 110 from a designated page buffers in the local buffer 106-2 or the (optional) buffer subsystem 160. These capabilities of the channel controller 112-3 will be advantageously employed to avoid the write back of a number of valid pages during garbage collection process, which be shown using FIG. 4

The process of garbage collecting one or more stripe blocks (also referred to herein as "source GC blocks") includes reading a valid LBA from a stripe, forming a new stripe of data segments, calculating parity segment, and writing back to new stripe blocks (hereafter "destination GC blocks").

If all of the LBAs comprise a data stripe segment (i.e. LBAs of a page) to be written to a destination GC block in a paSSD 70-1-*j* and are from a flash subsystem of the same paSSD, write back can be advantageously avoided by employing the capabilities of the channel controller 112-3 to save the LBAs that comprise the data stripe segment (i.e. LBAs of a page) from flash memory in a designated buffer and writing back to flash 110 from the designated buffer.

Figure 4:
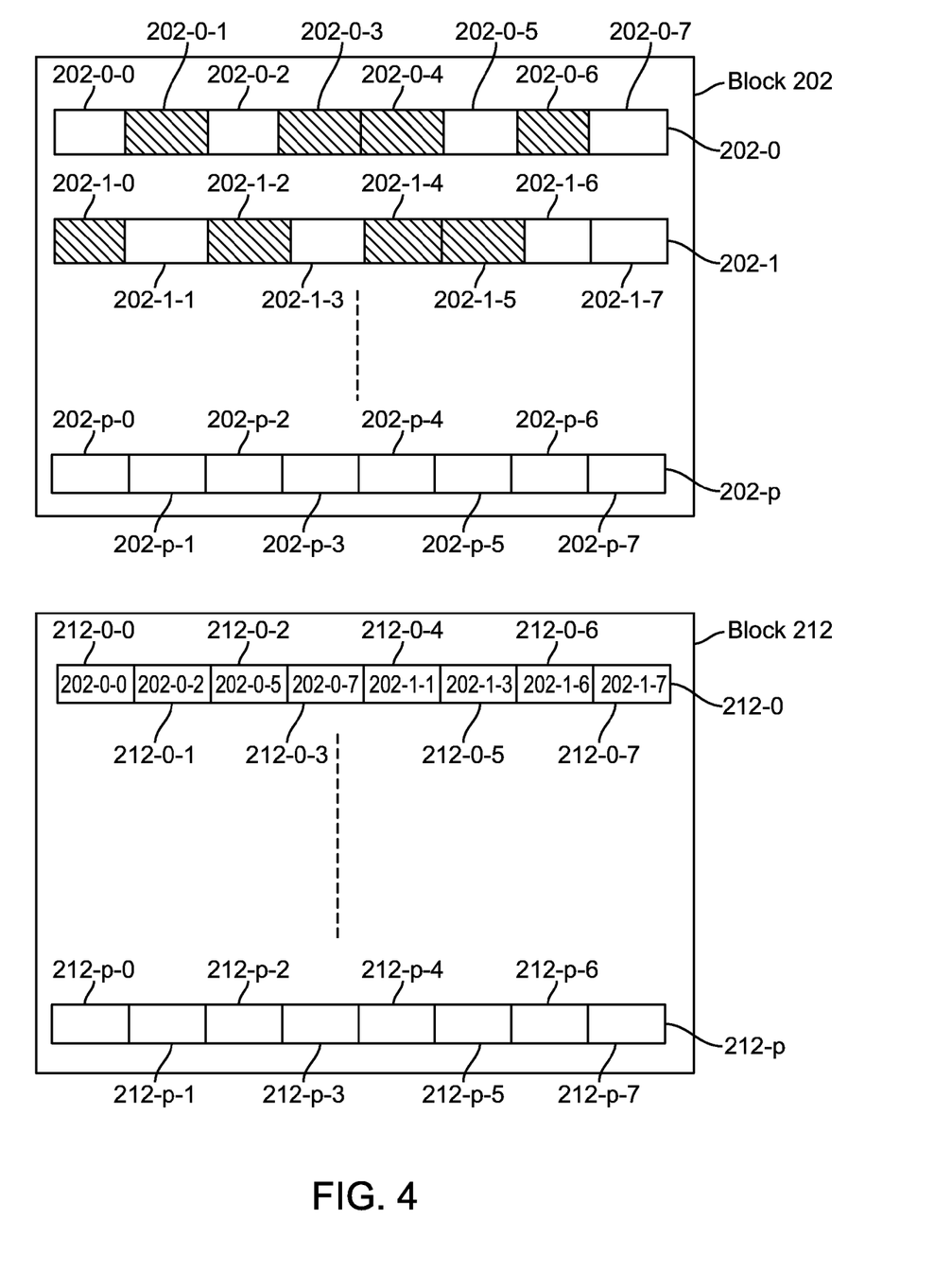
FIG. 4 shows a source GC block 202 and a destination GC block 212.

FIG. 4 shows an exemplary block 202 of a source GC block with pages 202-0, 202-1 and 202-*p* each including eight LBAs 202-0-0 to 202-0-7, 202-1-0 to 202-1-7 and 202-*p*-0 to 202-*p*-7 respectively. Further shown in FIG. 4 is that LBA 202-0-1, 202-0-3, 202-0-4 and 202-0-6 of page 202-0 and LBA 202-1-0, 202-1-2, 202-1-4 and 202-1-5 of page 202-1 are invalid (cross hashed in FIG. 4).

Further shown in FIG. 4 is block 212 a destination GC block with pages 212-0, and 212-*p* each including eight LBAs 212-0-0 to 212-0-7 and 212-*p*-0 to 212-*p*-7, respectively.

The host reads a page worth of valid LBAs from block 202 comprising of 202-0-0, 202-0-2, 202-0-5, 202-0-7, 202-1-1, 202-1-3, 202-1-6, 202-1-7 to form a data segment stripe and additionally saves the formed data segment stripe in a designated buffer onboard the paSSD. The host initiates write to destination GC block 212 page 212-0 from the designated buffer onboard paSSD, thus advantageously avoiding transfer of data and reducing bus bandwidth.

Figure 5:
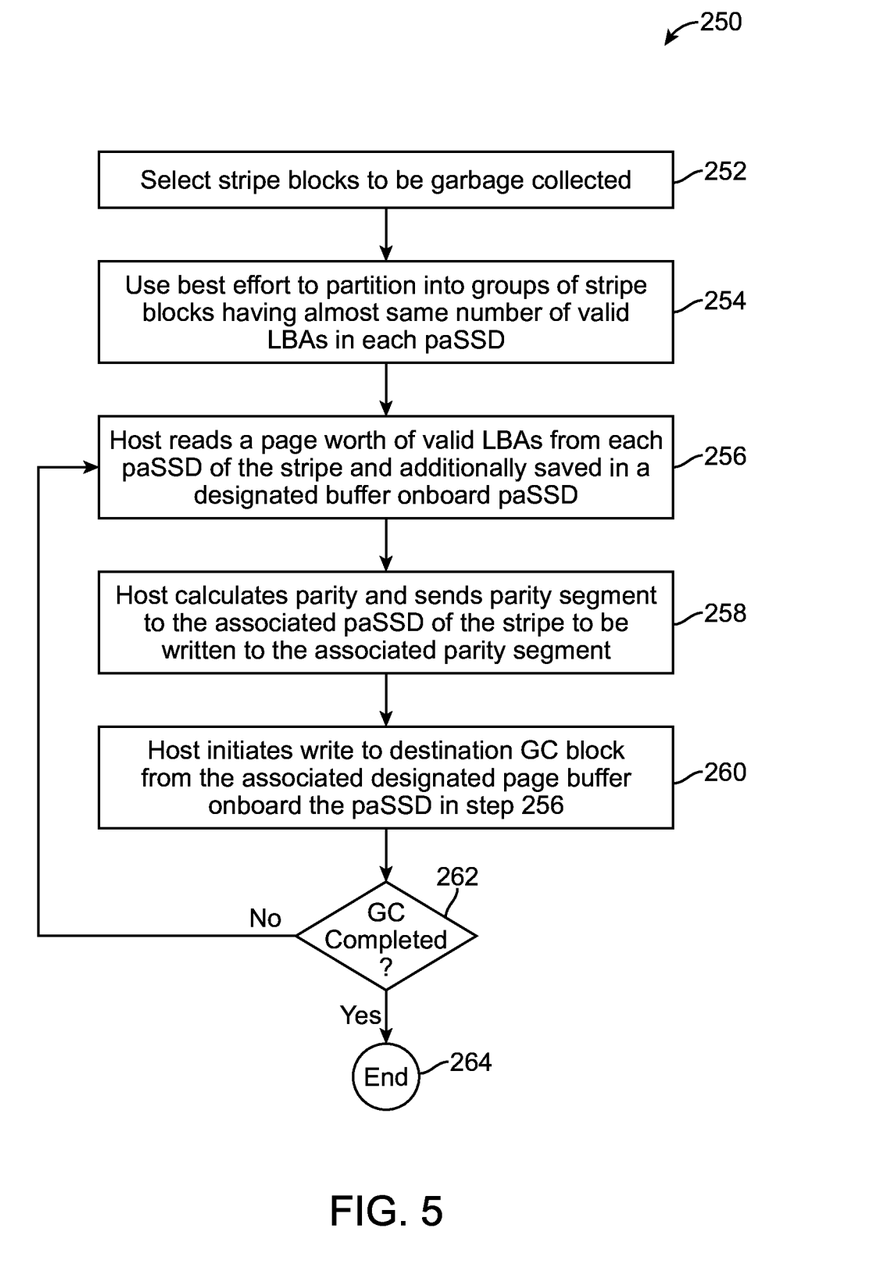
FIG. 5 shows a high level flow chart of garbage collection, in accordance with method of the invention.

FIG. 5 shows a high level flow chart 250 of garbage collection, in accordance with a method of the invention. At step 252, the stripe blocks to be garbage collected are selected. Next at step 252, the best effort is used to partition into groups of stripe blocks having almost the same number of LBAs (or any other measure of valid data such as valid number of bytes for compressed data) in each paSSD. Subsequently, at step 256, the host reads a page size worth of one or more pages of valid LBAs (or any other measure of valid data such as valid number of bytes for compressed data) and additionally saves the read page size worth of valid LBAs in a designated (page) buffer onboard the paSSD. Next, at step 258, the host calculates parity and sends the calculated parity segment to the associated paSSD of the stripe to be written to the associated parity segment. Next, at step 260, the host initiates a write to the destination GC block from the associated designated (page) buffer onboard the paSSDin step 256, thus advantageously avoiding transfer of data segment and reducing bus bandwidth. Next at step 262 a determination is made if GC is completed and if not the process resumes at step 256 otherwise, the process ends at 264.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A storage system comprising: one or more arrays of physically-addressed solid state disk (paSSD), each connected to a bus that conforms to Peripheral Component Interconnect Express (PCIe) protocol standards, through a connector, the one or more arrays of paSSDs being addressable using physical addresses associated with data, the data to be stored in the paSSD in blocks, the one or more arrays of paSSD including one or more stripes with each stripe having a segment, at least some of the segments including data and at least some of the segments including parity; and a non-volatile memory module coupled to a central processing unit (CPU) subsystem and the CPU subsystem coupled to the one or more arrays of paSSD, the non-volatile memory module located externally to the one or more arrays of paSSD and to the CPU subsystem, the non-volatile memory module including flash tables used by the CPU subsystem to manage blocks in the one or more arrays of paSSD, the flash tables including tables used to map logical-to-physical blocks addresses, the logical block addresses being host-provided and the physical block addresses for identifying the location of stored data in the paSSD, wherein the data to be written to a stripe is kept in the non-volatile memory module until a full stripe is available for writing the data to the paSSD regardless of the number of writes with no partial stripe writes being performed.

2. The storage system of claim 1, wherein the CPU subsystem includes a CPU coupled to the one or more arrays of paSSD via the bus.

3. The storage system of claim 2, wherein the CPU is coupled to the non-volatile memory module.

4. The storage system of claim 1, wherein the non-volatile memory module is a flash-backed memory.

5. The storage system, as recited in claim 4, wherein the flash-backed memory includes Dual Inline Memory Module (NV DIMM).

6. The storage system, as recited in claim 1, wherein the non-volatile memory includes magnetic random access memory (MRAM).

7. The storage system of claim 5, wherein the MRAM includes a spin torque transfer MRAM.

8. The storage system of claim 1, wherein one of the one or more stripes includes more than one segment and the segments within the stripe are each identified using logical block addresses (LBAs), wherein at least two of the LBAs of the stripe are random relative to each other.

9. The storage of claim 1, further including a stripe table used to identify the physical addresses (PAs) that form at least some of the stripe.

10. The storage system of claim 1, wherein the paSSDs further including a flash controller and a flash subsystem coupled to the flash controller via a flash interface.

11. The storage system of claim 10, wherein the flash controller includes a channel controller operable to control the flow of command on the flash interface, the command including physical addresses.

12. The storage system of claim 11, wherein the flash controller includes a channel controller operable to control the flow of data on the flash interface.

13. The storage system of claim 12, wherein the channel controller is operable to write to the flash subsystem from the designated page buffer.

14. The storage system of claim 10, wherein the flash controller includes a channel controller operable to control the flow of status on the flash interface.

15. The storage system of claim 14, further including a local buffer, the channel controller operable to save data that is read from the flash subsystem in response to one or more host read commands in a designated page buffer in the local buffer.

16. The storage system of claim 1, wherein each of at least some of the one or more arrays of paSSD have flash memory and further wherein the at least some of the one or more arrays of paSSD are written in units of blocks and the flash memory is written in units of page and wherein the flash memory is erased in units other than the units of block and the units of page.

17. The storage system of claim 16, wherein at least some of the paSSDs include dynamic random access memory (DRAM) and magnetic random access memory (MRAM).

18. The storage system of claim 1, wherein the one or more arrays of paSSDs include flash memory and other types of memory.

19. A storage system comprising: one or more arrays of physically-addressed solid state disks (paSSDs), each connected to a bus that is in conformance with Peripheral Component Interconnect Express (PCIe) protocol standards, through a connector, the one or more arrays of paSSDs being addressable using physical addresses data from a host, received in blocks, having associated therewith logical block addresses, the data to be stored in the paSSDs in blocks, the blocks of the paSSDs being identified by physical block addresses in the SSDs, the one or more arrays of paSSDs including one or more stripes with each stripe having a segment, at least some of the segments including dat aand at least some of the segments including parity; and a central processing unit (CPU) subsystem coupled to the one or more arrays of paSSD, and including a multi-core CPU and a PCIe controller, the PCIe controller connected coupled to the one or more arrays of paSSDs through a connector, the CPU subsystem causing writing of the data from the host to the one or more arrays of paSSDs in stripes, wherein each stripe includes data with random logical block addresses and a full stripe is formed before the data of the stripe is written to the one or more arrays of paSSDs with no partial stripe writes being performed.

20. The storage system of claim 19, further including a network interface controller (NIC) coupled to a network interface for communication with the host, the NIC coupled to the PCIe controller.

21. A storage system comprising: one or more arrays of physically-addressed solid state disks (paSSDs), each connected to a bus that is in conformance with Peripheral Component Interconnect Express (PCIe) protocol standards, through a connector, the one or more arrays of paSSDs being addressable using physical addresses, the data to be stored in the paSSD organized into blocks, the blocks being provided by a host using logical block addresses associated with the blocks, the one or more arrays of paSSDs including one or more stripes with each stripe having at least one segment, each segment including one of more blocks identified by physical block addresses, at least some of the segments including data and at least some of the segments including parity; and a system memory coupled to the one or more arrays of paSSDs through a CPU subsystem, the system memory including flash tables used by the CPU subsystem to manage the blocks in the one or more arrays of paSSD, the flash tables including tables used to map logical block addresses to physical blocks addresses, the physical block addresses for identifying the location of blocks of data in the paSSDs, the logical block addresses of a single stripe being random relative to one another; a non-volatile memory module (NVM) coupled to the CPU subsystem, the non-volatile memory module located externally to the one or more arrays of paSSD and to the CPU subsystem the flash tables are periodically saved in the one or more arrays of paSSDs and parts of the flash tables that are updated since the last save to the one or more arrays of paSSDs are maintained in the non-volatile memory module, further wherein after a stripe size worth of data is available for writing to the paSSDs, the stripe size worth of data being assigned to a stripe and saved in the NVM until written as a full stripe to the paSSDs with no partial stripe writes being performed.

22. The storage system of claim 21, wherein the at least some of the arrays of the one or more arrays of paSSD each include a module controller and a flash subsystem and the flash tables are saved in the flash subsystem of the paSSD.

23. The storage system of claim 21, wherein the data to be written to a stripe is kept in the non-volatile memory module until a full stripe is available for writing thereby avoiding writing a partial stripe.

24. The storage system of claim 21, wherein the system memory is located externally to the one or more arrays of paSSD.

\* \* \* \* \*